United States Patent
Brooker et al.

(10) Patent No.: US 11,010,188 B1
(45) Date of Patent: May 18, 2021

(54) SIMULATED DATA OBJECT STORAGE USING ON-DEMAND COMPUTATION OF DATA OBJECTS

(71) Applicant: Amazon Technologies, Inc., Seattle, WA (US)

(72) Inventors: Marc Brooker, Seattle, WA (US); Timothy Allen Wagner, Seattle, WA (US); Mikhail Danilov, Sammamish, WA (US); Niall Mullen, Seattle, WA (US); Holly Mesrobian, Bellevue, WA (US); Philip Daniel Piwonka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 157 days.

(21) Appl. No.: 16/268,353

(22) Filed: Feb. 5, 2019

(51) Int. Cl.
*G06F 9/455* (2018.01)
*H04L 29/08* (2006.01)
(Continued)

(52) U.S. Cl.
CPC ........ *G06F 9/45558* (2013.01); *G06F 3/0604* (2013.01); *G06F 11/3433* (2013.01); *H04L 67/1097* (2013.01); *G06F 2009/45579* (2013.01)

(58) Field of Classification Search
CPC ....... G06F 9/45558; G06F 2009/45579; H04L 67/1097
See application file for complete search history.

(56) References Cited

U.S. PATENT DOCUMENTS

| 4,949,254 A | 8/1990 | Shorter |
| 5,283,888 A | 2/1994 | Dao et al. |
(Continued)

FOREIGN PATENT DOCUMENTS

| CA | 2975522 A1 | 8/2016 |
| CN | 1341238 A | 3/2002 |
(Continued)

OTHER PUBLICATIONS

Y. Mansouri, A. Nadjaran Toosi, and R. Buyya. 2017. Cost optimization for dynamic replication and migration of data in cloud data centers. IEEE Trans. Cloud Comput. (2017) (Year: 2017).*

(Continued)

*Primary Examiner* — Jacob D Dascomb
(74) *Attorney, Agent, or Firm* — Knobbe, Martens, Olson & Bear, LLP

(57) ABSTRACT

Systems and methods are described for simulated data object storage on a data storage system. The system may allow clients to store computed data objects, which are generated from a source data object based on a user-defined transformation. For example, computed data objects may be thumbnail images generated based on a full resolution image. When a request to store a computed data object is received, the system can predict a timing of a next request for the data object. If expected resource consumption associated with storing the data object until a next request exceeds expected resource consumption associated with generating the data object in response to the next request, the system can acknowledge the request to store the data object, but not actually store the data object. Instead, the system may generate the data object in response to the next request.

20 Claims, 5 Drawing Sheets

(51) Int. Cl.
  *G06F 3/06* (2006.01)
  *G06F 11/34* (2006.01)

(56) References Cited

U.S. PATENT DOCUMENTS

| | | |
|---|---|---|
| 5,835,764 A | 11/1998 | Platt et al. |
| 5,970,488 A | 10/1999 | Crowe et al. |
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B2 | 3/2008 | Basu et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,966,495 B2 | 2/2015 | Kulkarni |
| 8,972,980 B2 | 3/2015 | Banga et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,417,918 B2 | 8/2016 | Chin et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |

(56) References Cited

U.S. PATENT DOCUMENTS

| | | |
|---|---|---|
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,623,476 B2 | 4/2020 | Thompson |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2006/0010440 A1 | 1/2006 | Anderson et al. |
| 2006/0015740 A1 | 1/2006 | Kramer |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0248195 A1 | 11/2006 | Toumura et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |

(56) References Cited

U.S. PATENT DOCUMENTS

| | | |
|---|---|---|
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |

(56) References Cited

U.S. PATENT DOCUMENTS

| | | |
|---|---|---|
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |

(56) References Cited

U.S. PATENT DOCUMENTS

| | | |
|---|---|---|
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0147656 A1 | 5/2017 | Choudhary et al. |
| 2017/0149740 A1 | 5/2017 | Mansour et al. |
| 2017/0161059 A1 | 6/2017 | Wood et al. |
| 2017/0177854 A1 | 6/2017 | Gligor et al. |
| 2017/0188213 A1 | 6/2017 | Nirantar et al. |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286143 A1 | 10/2017 | Wagner et al. |
| 2017/0286187 A1 | 10/2017 | Chen et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0371724 A1 | 12/2017 | Wagner et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0121245 A1 | 5/2018 | Wagner et al. |
| 2018/0121665 A1 | 5/2018 | Anderson et al. |
| 2018/0129684 A1 | 5/2018 | Wilson et al. |
| 2018/0143865 A1 | 5/2018 | Wagner et al. |
| 2018/0150339 A1 | 5/2018 | Pan et al. |
| 2018/0192101 A1 | 7/2018 | Bilobrov |
| 2018/0225096 A1 | 8/2018 | Mishra et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0309819 A1 | 10/2018 | Thompson |
| 2018/0314845 A1 | 11/2018 | Anderson et al. |
| 2018/0341504 A1 | 11/2018 | Kissell |
| 2019/0004866 A1 | 1/2019 | Du et al. |
| 2019/0028552 A1 | 1/2019 | Johnson, II et al. |
| 2019/0043231 A1 | 2/2019 | Uzgin et al. |
| 2019/0072529 A1 | 3/2019 | Andrawes et al. |
| 2019/0079751 A1 | 3/2019 | Foskett et al. |
| 2019/0102231 A1 | 4/2019 | Wagner |
| 2019/0108058 A1 | 4/2019 | Wagner et al. |
| 2019/0140831 A1 | 5/2019 | De Lima Junior et al. |
| 2019/0147085 A1 | 5/2019 | Pal et al. |
| 2019/0155629 A1 | 5/2019 | Wagner et al. |
| 2019/0171423 A1 | 6/2019 | Mishra et al. |
| 2019/0171470 A1 | 6/2019 | Wagner |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0227849 A1 | 7/2019 | Wisniewski et al. |
| 2019/0235848 A1 | 8/2019 | Swiecki et al. |
| 2019/0238590 A1* | 8/2019 | Talukdar ............... G06F 16/183 |
| 2019/0250937 A1 | 8/2019 | Thomas et al. |
| 2019/0286475 A1 | 9/2019 | Mani |
| 2019/0303117 A1 | 10/2019 | Kocberber et al. |
| 2019/0318312 A1 | 10/2019 | Foskett et al. |
| 2019/0361802 A1 | 11/2019 | Li et al. |
| 2019/0363885 A1 | 11/2019 | Schiavoni et al. |
| 2019/0384647 A1 | 12/2019 | Reque et al. |
| 2019/0391834 A1 | 12/2019 | Mullen et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0104198 A1 | 4/2020 | Hussels et al. |
| 2020/0104378 A1 | 4/2020 | Wagner et al. |
| 2020/0110691 A1 | 4/2020 | Bryant et al. |
| 2020/0120120 A1 | 4/2020 | Cybulski |

(56) References Cited

U.S. PATENT DOCUMENTS

| | | |
|---|---|---|
| 2020/0142724 A1 | 5/2020 | Wagner et al. |
| 2020/0167208 A1 | 5/2020 | Floes et al. |
| 2020/0192707 A1 | 6/2020 | Brooker et al. |
| 2020/0213151 A1 | 7/2020 | Srivatsan et al. |
| 2020/0341741 A1 | 10/2020 | Brooker et al. |
| 2020/0341799 A1 | 10/2020 | Wagner et al. |
| 2020/0366587 A1 | 11/2020 | White et al. |
| 2020/0412707 A1 | 12/2020 | Siefker et al. |
| 2020/0412720 A1 | 12/2020 | Siefker et al. |
| 2020/0412825 A1 | 12/2020 | Siefker et al. |

FOREIGN PATENT DOCUMENTS

| | | |
|---|---|---|
| CN | 101002170 A | 7/2007 |
| CN | 101345757 A | 1/2009 |
| CN | 10146005 A | 7/2009 |
| EP | 2663052 A1 | 11/2013 |
| EP | 3201762 A1 | 8/2017 |
| EP | 3254434 A1 | 12/2017 |
| EP | 3201768 B1 | 12/2019 |
| JP | 2002287974 A | 10/2002 |
| JP | 2006-107599 A | 4/2006 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098445 A1 | 5/2018 |
| WO | WO 2020/005764 A1 | 1/2020 |
| WO | WO 2020/069104 A1 | 4/2020 |

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].
Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Retrieved from the Internet, Jun. 26, 2016, URL : http://docs.aws.amazon.com/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Bhadani et al., Performance evaluation of web servers using central load balancing policy over virtual machines on cloud, Jan. 2010, 4 pages.
CodeChef ADMIN discussion web page, retrieved from https://discuss.codechef.com/t/what-are-the-memory-limit-and-stack-size-on-codechef/14159, 2019.
CodeChef IDE web page, Code, Compile & Run, retrieved from https://www.codechef.com/ide, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Deis, Container, 2014, 1 page.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Han et al., Lightweight Resource Scaling for Cloud Applications, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
http://www.codechef.com/ide web page from date Apr. 5, 2015, retrieved using the WayBackMachine, from https://web.archive.org/web/20150405045518/http://www.codechef.com/ide, 2015.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Sakamoto, et al. "Platform for Web Services using Proxy Server"; Research Report from Information Processing Society, Mar. 22, 2002, vol. 2002, No. 31.

(56) References Cited

OTHER PUBLICATIONS

Shim (computing), Wikipedia, https://en.wikipedia.org/w/index.php?title+Shim_(computing)&oldid+654971528, [retrieved on May 26, 2016], 2 pages.

Stack Overflow, Creating a database connection pool, 2009, 4 pages.

Tan et al., Provisioning for large scale cloud computing services, Jun. 2012, 2 pages.

Vaghani, S.B., Virtual Machine File System, ACM SIGOPS Operating Systems Review 44(4):57-70, Dec. 2010.

Vaquero, L., et al., Dynamically Scaling Applications in the cloud, ACM SIGCOMM Computer Communication Review 41(1):45-52, Jan. 2011.

Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL<https://ieeexplore.ieee.org/stamp/stamp.jsp?tp=&arnumber=7097814, 8 pages.

Wikipedia "API" pages from date Apr. 7, 2015, retrieved using the WayBackMachine from https://web.archive.org/web/20150407191158/https://en.wikipedia.org/wiki/Application_programming_interface.

Wikipedia List_of_HTTP status_codes web page, retrieved from https://en.wikipedia.org/wiki/List_of_HTTP status_codes, 2019.

Wikipedia Recursion web page from date Mar. 26, 2015, retrieved using the WayBackMachine, from https://web.archive.org/web/20150326230100/https://en.wikipedia.org/wiki/Recursion_(computer _science), 2015.

Wikipedia subroutine web page, retrieved from https://en.wikipedia.org/wiki/Subroutine, 2019.

Wu et al., HC-Midware: A Middleware to Enable High Performance Communication System Simulation in Heterogeneous Cloud, Association for Computing Machinery, Oct. 20-22, 2017, 10 pages.

Yamasaki et al. "Model-based resource selection for efficient virtual cluster deployment", Virtualization Technology in Distributed Computing, ACM, Nov. 2007, pp. 1-7.

Yue et al., AC 2012-4107: Using Amazon EC2 in Computer and Network Security Lab Exercises: Design, Results, and Analysis, 2012, American Society for Engineering Education 2012.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2015/052810 dated Dec. 17, 2015.

International Preliminary Report on Patentability in PCT/US2015/052810 dated Apr. 4, 2017.

Extended Search Report in European Application No. 15846932.0 dated May 3, 2018.

International Search Report and Written Opinion in PCT/US2015/052838 dated Dec. 18, 2015.

International Preliminary Report on Patentability in PCT/US2015/052838 dated Apr. 4, 2017.

Extended Search Report in European Application No. 15847202.7 dated Sep. 9, 2018.

International Search Report and Written Opinion in PCT/US2015/052833 dated Jan. 13, 2016.

International Preliminary Report on Patentability in PCT/US2015/052833 dated Apr. 4, 2017.

Extended Search Report in European Application No. 15846542.7 dated Aug. 27, 2018.

International Search Report and Written Opinion in PCT/US2015/064071 dated Mar. 16, 2016.

International Preliminary Report on Patentability in PCT/US2015/064071 dated Jun. 6, 2017.

International Search Report and Written Opinion in PCT/US2016/016211 dated Apr. 13, 2016.

International Preliminary Report on Patentability in PCT/US2016/016211 dated Aug. 17, 2017.

International Search Report and Written Opinion in PCT/US2016/026514 dated Jun. 8, 2016.

International Preliminary Report on Patentability in PCT/US2016/026514 dated Oct. 10, 2017.

International Search Report and Written Opinion in PCT/US2016/026520 dated Jul. 5, 2016.

International Preliminary Report on Patentability in PCT/US2016/026520 dated Oct. 10, 2017.

International Search Report and Written Opinion in PCT/US2016/054774 dated Dec. 16, 2016.

International Preliminary Report on Patentability in PCT/US2016/054774 dated Apr. 3, 2018.

International Search Report and Written Opinion in PCT/US2016/066997 dated Mar. 20, 2017.

International Preliminary Report on Patentability in PCT/US2016/066997 dated Jun. 26, 2018.

International Search Report and Written Opinion in PCT/US/2017/023564 dated Jun. 6, 2017.

International Preliminary Report on Patentability in PCT/US/2017/023564 dated Oct. 2, 2018.

International Search Report and Written Opinion in PCT/US2017/040054 dated Sep. 21, 2017.

International Preliminary Report on Patentability in PCT/US2017/040054 dated Jan. 1, 2019.

International Search Report and Written Opinion in PCT/US2017/039514 dated Oct. 10, 2017.

International Preliminary Report on Patentability in PCT/US2017/039514 dated Jan. 1, 2019.

Extended European Search Report in application No. 17776325.7 dated Oct. 23, 2019.

Office Action in European Application No. 17743108.7 dated Jan. 14, 2020.

Ha et al., A Concurrent Trace-based Just-In-Time Compiler for Single-threaded JavaScript, utexas.edu (Year: 2009).

Huang, Zhe, Danny HK Tsang, and James She. "A virtual machine consolidation framework for mapreduce enabled computing clouds." 2012 24th International Teletraffic Congress (ITC 24). IEEE, 2012. (Year: 2012).

Lagar-Cavilla, H. Andres, et al. "Snowflock: Virtual machine cloning as a first-class cloud primitive." ACM Transactions on Computer Systems (TOCS) 29.1 (2011): 1-45. (Year: 2011).

Tange, "GNU Parallel: The Command-Line Power Tool", vol. 36, No. 1, Jan. 1, 1942, pp. 42-47.

Wood, Timothy, et al. "Cloud Net: dynamic pooling of cloud resources by live WAN migration of virtual machines." ACM Sigplan Notices 46.7 (2011): 121-132. (Year: 2011).

Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.

Extended Search Report in European Application No. 19199402.9 dated Mar. 6, 2020.

Office Action in Canadian Application No. 2,962,633 dated May 21, 2020.

Office Action in Canadian Application No. 2,962,631 dated May 19, 2020.

Office Action in European Application No. 16781265.0 dated Jul. 13, 2020.

International Search Report and Written Opinion dated Oct. 15, 2019 for International Application No. PCT/US2019/039246 in 16 pages.

International Search Report for Application No. PCT/US2019/038520 dated Aug. 14, 2019.

International Search Report for Application No. PCT/US2020/039996 dated Oct. 8, 2020.

Bebenita et al., "Trace-Based Compilation in Execution Environments without Interpreters," ACM, Copyright 2010, 10 pages.

Fan et al., Online Optimization of VM deployment in IaaS Cloud, 2012, 6 pages.

Search Query Report from IP.com, performed Dec. 2, 2020.

Office Action in Japanese Application No. 2017-516160 dated Jan. 15, 2018.

Notice of Allowance in Japanese Application No. 2017-516160 dated May 8, 2018.

Office Action in Indian Application No. 201717013356 dated Jan. 22, 2021.

(56) References Cited

OTHER PUBLICATIONS

Office Action in Japanese Appilcation No. 2017-516168 dated Mar. 26, 2018.
Office Action in Indian Application No. 201717019903 dated May 18, 2020.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21. 2020.
First Examination Report for Indian Application No.: 201717034806 dated Jun. 25, 2020.
Office Action in european Application No. 201817013748 dated Nov. 20, 2020.
Office Action in European Application No. 17743108.7 dated Dec. 22, 2020.
International Preliminary Report on Patentability dated Dec. 29, 2020 for International Application No. PCY/US2019/039246 in 8 pages.
International Preliminary report on Patentability for Application No. PCT/US2019/038520 dated Dec. 29, 2020.
International Search Report and Written Opinion in PCT/US2019/053123 dated Jan. 7, 2020.
International Search Report for Application No. PCT/US2019/065365 dated Mar. 19, 2020.

\* cited by examiner

SIMULATED DATA OBJECT STORAGE USING ON-DEMAND COMPUTATION OF DATA OBJECTS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
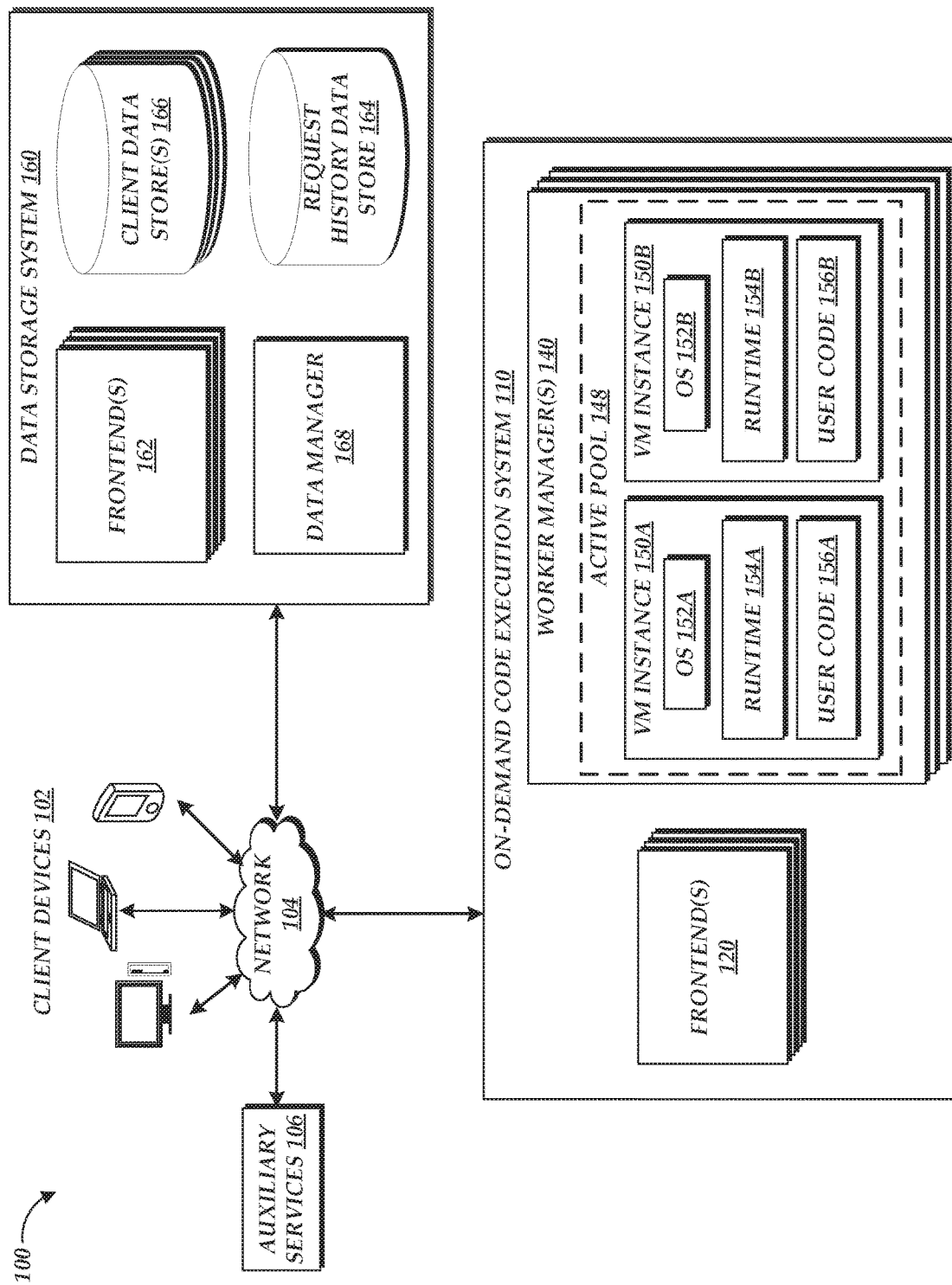
FIG. 1 is a block diagram depicting an illustrative environment in which a data storage system can operate in conjunction with an on-demand code execution system to provide simulated storage of computed data objects, potentially without actually storing such data objects, and to determine whether to store such data objects based at least partly on a next expected request for the data objects.

Generally described, aspects of the present disclosure relate to handling of storage of data objects on a data storage system. More specifically, aspects of the present disclosure relate to handling of computed data objects and to potentially simulating storage of such computed data objects at the data storage system, rather than incurring the computational resource consumption of storing such data objects. As used herein, the term computed data objects generally refers to data objects which are generated based on a transformation of other data stored at or available to the data storage system. For example, a computed data object may be a thumbnail image, which is generated based on a transformation of larger image data object. A user may wish to utilize a data storage system to store computed data objects. For example, a user may request that each time a full resolution image is uploaded to the data storage system, the service (or a related service, such as the on-demand code execution system described in detail below) generate and store a corresponding thumbnail image. However, storage of such computed data objects, particularly when viewed in aggregate, can require non-trivial computing resources. Thus, rather than store a computed data object, a data storage system in accordance with embodiments of the present disclosure may "lazily" generate the computed data object, either on request from a client or just prior to such request. Moreover, rather than storing the computed data object from that point forward, the data storage system can be configured to predict a timing of a next request for the computed data object, and compare an estimated consumption (or "cost") of computing resources required to store the data object until that next request to an estimated consumption of computing resources required to recompute the data object at or just prior to the next request. When the estimated consumption of computing resources required to recompute the data object at or prior to the next request is less than the estimated consumption of computing resources required to store the data object, the data storage system can decline to store the data object. In this manner, storage of the computed data object can be "simulated." Specifically, while a client device may interact with the data storage system to store and retrieve computed data objects, as if the data objects were persisted at the data storage system, the storage service may not in fact be storing the data object.

To facilitate computation of data objects, a data storage system as disclosed herein may include or operate in conjunction with an on-demand code execution system enabling rapid execution of code, which may be supplied by users of the on-demand code execution system. An on-demand code execution system may also be known as a "serverless" execution system or a request-drive code execution system.

As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). The on-demand code execution system may implement a variety of technologies to enable rapid execution of code. Illustratively, the on-demand code execution system may be configured to maintain a number of execution environments, such as virtual machine instances, software containers, or the like, in which code of a task may be provisioned and executed.

In accordance with embodiments of the present disclosure, a client may utilize an on-demand code execution system to generate computed data items, intended to be stored on a data storage system. For example, a client may configure the on-demand code execution system to execute code that transforms an image into a thumbnail representation, converts a format of audio, video, or text, parses or translates data from one form to another, etc. The client may then instruct the on-demand code execution system to execute the code, with the intention that as a result of code execution, the on-demand code execution system generates and stores a computed data object on the data storage system. In some instances, a client may configure the data storage system or on-demand code execution environment to automatically generate computed data objects based on events occurring on or viewable by the on-demand code execution system or the data storage system. For example, a client may specify that each time a specific type of data object (e.g., matching a given set of parameters) is stored within a relevant location of the data storage system, that the on-demand code execution system generate one more corresponding computed data objects based on the specific data object.

As noted above, computation and storage of data objects generally incurs resource consumption on the data storage system and/or the on-demand code execution system. Thus, rather than generating a computed data object at the time of a request to generate the data object, the data storage system and the on-demand code execution system may be configured to delay generation of the computed data object, until or just prior to a request for the computed data object. In this manner, the computational resource consumption associated with storage of the data object between a request to generate the data object and a request to retrieve the data object can be reduced or eliminated. Because the on-demand code execution system can facilitate rapid generation of code to generate the computed data object, generation of the computed data object on request by a user may not result in noticeable delay to retrieve the data object. However, as will be discussed below, the data storage system and on-demand code execution system may be configured to account for any potential delay related to on-demand generation of a computed data object when determining whether to delay generation of the data object.

Moreover, after a computed data object has been generated, the data storage system can in accordance with the present embodiments be configured to determine whether to store the computed data object, or discard the data object in favor or recomputing the data object at (or just before) a next request for the data object. More specifically, the data storage system may at various points in time (e.g., on obtaining a computed data object or periodically thereafter) utilize a history of requests to the data storage system to predict a next request for the computed data object. In one embodiment, the data storage system may predict a next request based on a history of requests for the data object, such as by calculating a frequency of historical requests for the data object, and extrapolating from the frequency and a last request a predicted time of a next request. In some embodiments, the data storage system may utilize additional or alternative techniques, such as linear regression analysis or other statistical measures, to predict a timing of a next (or other future) requests based on a history of requests. Still further, in some embodiments the data storage system may utilize machine learning techniques (e.g., neural networks) to predict a timing of a next request to access a data object. A variety of techniques utilizing statistical models or machine learning to predict a next event in a sequence of events are known in the art, any of which may be applied in accordance with embodiments of the present disclosure to predict a timing of a next request for a data object. In some instances, such as where history of requests to access a data object are limited, the data storage system may additionally or alternatively utilize a history of requests to access other data objects on the data storage system to predict a timing of a next request to access a computed data object. Other data objects may include, for example, other data objects designated for storage within a common storage location (e.g., the same folder, group, or bucket), other data objects sharing common formats, other data objects of the user, etc.

On predicting a next request to access a computed data object, the data storage system may calculate a resource consumption associated with storing the computed data object until the next request to access the data object, and alternatively with discarding the computed data object and recomputing the data object at or just prior to the next request. Each metric of resource consumption (which may be viewed as a "cost" in terms of resource used) may be based on the computing resources required for the respective actions. Illustratively, the metric of resource consumption to store the data object until a next request may include a metric of resource consumption in terms of bits of memory (e.g., hard disk drive storage) of the data storage system used to store the data object. The metric of resource consumption of recomputing the data object may include a metric of resource consumption in terms of processing power of the on-demand code execution system used to generate the data object, network bandwidth required to transfer the computed data object from the on-demand code execution system to the data processing system, etc. The data storage system may be configured with weights, enabling these respective metrics of resource consumption (potentially expressed in different units of measurement) to be compared. For example, where the data storage system has access to relatively little long-term storage memory but excess processing power, the metric of storing a computed data object may be weighted heavily, and the metric of recomputing a data object may be weighted lightly. In such a scenario, the data storage system may be more likely to recompute a data object than to store the data object. Conversely, where the data storage system has access to a high amount of long-term memory but little access to processing power, an inverse result is likely.

In one embodiment, the metric of resource consumption on the data storage system may vary over time. For example, the amount of available storage memory of the data storage system may vary based on use of that memory to store data objects of clients. The amount of processing power of the on-demand code execution system may vary based on use of processing power to execute code on behalf of clients. In one embodiment, the data storage system is configured to estimate the relevant metric of resource consumption associated with either storing or recomputing a computed data object. For example, the metric of resource consumption of storing a data object may be represented as the aggregated metrics of storing the data object for each period of time in a series of time periods between a current time and the time of a next request to access the data object, with the metric of each period of time being weighted according to a predicted availability of storage during that period of time. Similarly, the metric of resource consumption of recomputing a data object at or just prior to a next request for the data object may be calculated based on an expected availability of processing power when that recomputation would occur. Future computation metrics may be modeled based on historical computational availabilities, in a manner similarly to how a timing of a next request may be predicted based on historical requests (e.g., by application of statistical or machine learning techniques to predict a future sequence based on historical sequence information).

After determining the expected metrics of resource consumption of storing or recomputing a data object, the data storage system may determine whether to continue to store (or generate and store) a data object, based on a comparison of metrics to store or recompute the data object. If the metrics of continuing to store a data object do not exceed those to recompute the data object, the data storage system may continue to store the data object, and respond to a next request to retrieve the data object by providing the data object. If the metrics of continuing to store the data object exceed those to recompute the data object, the data storage system may delete the data object (if necessary), thus avoiding the storage source usage associated with storing the data object. On or just prior to a next request to access the data object, the data storage system may utilize the on-demand code execution system to recompute the data object, thus enabling a client to access the data object as if it had been stored on the data storage system. In this manner, the data storage system can operate to "simulate" storage of computed data objects, without requiring that those data objects be stored, particularly in instances where such storage is inefficient in terms of resource use of the data storage system.

As will be appreciated by one of skill in the art in light of the present disclosure, the embodiments disclosed herein improves the ability of computing systems, such as data storage systems, to store computed data objects an efficient manner. Specifically, embodiments of the present disclosure increase the efficiency of computing resource usage of such systems by enabling the data storage system to weight metrics of resource consumption of storing the data objects against metrics of resource consumption to recompute the data objects, and to select an action that is expected to minimize computing resource usage by the data storage system (and/or an associated on-demand code execution system). Moreover, the presently disclosed embodiments address technical problems inherent within computing systems; specifically, the limited nature of computing resources with which to store or compute data objects and the inefficiencies caused by maintaining infrequently accessed data objects within memory of a data storage system. These technical problems are addressed by the various technical solutions described herein, including the use of a next predicted request for a data object to compare metrics for storing the data object against metrics for of recomputing the data object, and selection of whether to store the data object based on that comparison. Thus, the present disclosure represents an improvement on existing data processing systems and computing systems in general.

The general execution of tasks on the on-demand code execution system will now be discussed. As described in detail herein, the on-demand code execution system may provide a network-accessible service enabling users to submit or designate computer-executable source code to be executed by virtual machine instances on the on-demand code execution system. Each set of code on the on-demand code execution system may define a "task," and implement specific functionality corresponding to that task when executed on a virtual machine instance of the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Specifically, to execute tasks, the on-demand code execution system described herein may maintain a pool of executing virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances, or may be executed within a virtual machine instance isolated from other virtual machine instances acting as environments for other tasks. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) can be significantly reduced.

Because the number of different virtual machine instances that a host computing device may execute is limited by the computing resources of that host (and particularly by highly utilized resources such as CPU cycles and RAM), the number of virtual machine instances in a pool on the on-demand code execution system is similarly limited. Thus, in accordance with the embodiments of the present disclosure, the on-demand code execution system may generate execution environments for a large number of tasks (e.g., more environments than could be maintained as executing on the on-demand code execution system at a given point in time), and transition a subset (e.g., a majority) of those environments into lower tier memory storage, based on a next expected utilization of each environment. Thus, a primary memory of the on-demand code execution system can be expected to hold environments either being actively used or expected to be used in a very short amount of time. As environments within the primary memory become idle, the on-demand code execution system can transition the environments to secondary memory based on future expected use, and move into primary memory those environments which are next expected to be used. In this manner, the overall efficiency of primary memory within the on-demand code execution system is increased.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which a data storage system 160 and an on-demand code execution system 110 may operate based on communication with client devices 102 and auxiliary services 106. By way of illustration, various example client devices 102 are shown in communication with the data storage system 160 and on-demand code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the client devices 102 with one or more user interfaces, command-line interfaces (CLIs), application programing interfaces (APIs), and/or other programmatic interfaces for generating and uploading user-executable code (e.g., including metadata identifying dependency code objects for the uploaded code), invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices of the data storage system 160, on-demand code execution system 110, or auxiliary services 106, that access respective services provided by the data storage system 160 or on-demand code execution system 110.

The illustrative environment 100 further includes one or more auxiliary services 106, which can interact with the data storage system 160 and/or on-demand code execution environment 110 to implement desired functionality on behalf of a user. Auxiliary services 106 can correspond to network-connected computing devices, such as servers, which generate data accessible to the data storage system 160 and/or on-demand code execution environment 110 or otherwise communicate to the data storage system 160 and/or on-demand code execution environment 110. For example, the auxiliary services 106 can include web services (e.g., associated with the client devices 102, with the on-demand code execution system 110, or with third parties), databases, really simple syndication ("RSS") readers, social networking sites, or any other source of network-accessible service or data source. In some instances, auxiliary services 106 may be associated with the data storage system 160 and/or on-demand code execution system 110, e.g., to provide billing or logging services to the data storage system 160 and/or on-demand code execution system 110. In some instances, auxiliary services 106 actively transmit information, such as API calls or other task-triggering information, to the data storage system 160 and/or on-demand code execution system 110. In other instances, auxiliary services 106 may be passive, such that data is made available for access by the data storage system 160 and/or on-demand code execution system 110. For example, components of the data storage system 160 and/or on-demand code execution system 110 may periodically poll such passive data sources, and trigger execution of tasks within the on-demand code execution system 110 based on the data provided. While depicted in FIG. 1 as distinct from the client devices 102 and the on-demand code execution system 110, in some embodiments, various auxiliary services 106 may be implemented by either the client devices 102 or the data storage system 160 and/or on-demand code execution system 110.

The client devices 102, auxiliary services 106, data storage system 160, and on-demand code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The data storage system 160 represents a service configured to enable client devices 102 to store and retrieve data from one or more client data stores 166, each of which may a hard disk drive (HDD), solid state drive (SSD), network attached storage (NAS), or any other persistent or substantially persistent storage. Additionally, in some embodiments, client data stores 166 may include transitory storage, such as random access memory (RAM). For example, the data storage system 160 may represent a caching service intended to store client data for relatively short periods.

In general, the data storage system 160 may operate with respect to data objects, each of which corresponds to a defined set of data storable and retrievable on the service 160. Each data object may illustratively represent a file on a computing device. To facilitate storage and retrieval of data objects, the service 160 includes one or more frontends 162 that receive and process requests of client devices 102 to interact with the service 160 (e.g., including authenticating requests, verifying requests, etc.). While not shown in FIG. 1, the data storage system 160 may in some embodiments include additional or alternative components to facilitate storage of data objects, such as devices to manage replication of client data across multiple client data storages 166. General operation of a network-based data storage system to facilitate storage and retrieval of data objects is known in the art. AMAZON™'s "Simple Storage Service," or "S3" is on example of a data storage system implementing a frontend 120 and client data stores 166, which may be modified and/or configured in accordance with the present disclosure to provide simulated data object storage.

In accordance with embodiments of the present disclosure, the data storage system 160 further includes a data manager 168 configured to implement aspects of the present disclosure, such as the determination of whether to store a computed data object, or decline to store the object in favor of recomputing the object at a later time (e.g., at or just prior to a request for the data object). The data manager 168 may illustratively implement the routine 500, discussed below, to predict a next request for a data object, and to compare estimated computational resource metrics associated with either storage or recomputation of the data object. The data manager 168 may then control operation of the data storage system 160, or interaction of the data storage system 160 with the on-demand code execution system 110, to either store data objects, or facilitate later recomputation of the data objects, according to estimated metrics of those actions. To facilitate operation of the data manager 168 to predict a timing of a next request to access a data object, the data storage system 160 further includes a request history data store 164, which includes a history of requests to access data objects on the data storage system 160. In one embodiment, the request history data store 164 is implemented as a logical portion of the client data stores 166. In another embodiment, the request history data store 164 is a separate data store, implemented by any one or more persistent or substantially persistent data storage devices.

To facilitate generation of computed data objects, the data storage system 160 may interact with an on-demand code execution system 110, which may enable client devices 102 to provide executable code, and establish rules or logic defining when and how such code should be executed on the on-demand code execution system 110, thus establishing a "task." A task may illustratively execute to generate a data object from another set of data stored on or available to the data storage system 160. For example, a task may represent code executable to transform a full resolution image to a thumbnail image, to convert a format of a multimedia file, to parse a text file into structure data, or the like. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via client devices 102) to provide, request execution of, and view results of computer executable code. The frontends 120 include a variety of components to enable interaction between the on-demand code execution system 110 and other computing devices. For example, each frontend 120 may include a request interface providing client devices 102 with the ability to upload or otherwise communication user-specified code to the on-demand code execution system 110 and to thereafter request execution of that code. In one embodiment, the request interface communicates with external computing devices (e.g., client devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task (which may also be referred to as a request to execute the task) may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from client devices 102 (e.g., as received at the request interface). For example, a user may manually call a task to request that a computed data object be generated from another data object. Alternatively or additionally, tasks may be triggered for execution at the on-demand code execution system 110 based on data retrieved from one or more auxiliary services 106 or the data storage system 160. For example, a user may request that each time a new data object is stored in one location of the data storage system 160 (e.g., a specific folder or bucket), a corresponding computed data object be generated and stored in another location of the data storage system 160.

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the client devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 148 described below, the load balancer may distribute calls according to the capacities or loads on those other components. Calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. For example, calls may be distributed to load balance between frontend 120. Other distribution techniques, such as anycast routing, will be apparent to those of skill in the art.

The on-demand code execution system further includes one or more worker managers 140 that manage the execution environments, such as virtual machine instances 150 (shown as VM instance 150A and 150B, generally referred to as a "VM"), used for servicing incoming calls to execute tasks, and that manage the memory states of execution environments. While the following will be described with reference to virtual machine instances 150 as examples of such environments, embodiments of the present disclosure may utilize other environments, such as software containers. In the example illustrated in FIG. 1, each worker manager 140 manages an active pool 148, which is a group (sometimes referred to as a pool) of virtual machine instances 150 executing on one or more physical host computing devices that are initialized to execute a given task (e.g., by having the code of the task and any dependency data objects loaded into the instance). The active pool 148 illustratively is implemented using primary memory (e.g., RAM) of host devices implementing or under control of the worker manager 140.

Although the virtual machine instances 150 are described here as being assigned to a particular task, in some embodiments, the instances may be assigned to a group of tasks, such that the instance is tied to the group of tasks and any tasks of the group can be executed within the instance. For example, the tasks in the same group may belong to the same security group (e.g., based on their security credentials) such that executing one task in a container on a particular instance 150 after another task has been executed in another container on the same instance does not pose security risks. As another example, the tasks of the group may share common dependencies, such that an environment used to execute one task of the group can be rapidly modified to support execution of another task within the group.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

Thereafter, the worker manager 140 may modify a virtual machine instance 150 (if necessary) and execute the code of the task within the instance 150. As shown in FIG. 1, respective instances 150 may have operating systems (OS) 152 (shown as OS 152A and 152B), language runtimes 154 (shown as runtime 154A and 154B), and user code 156 (shown as user code 156A and 156B). The OS 152, runtime 154, and user code 156 may collectively enable execution of the user code to implement the task. In some instances, each VM 150 may be associated with additional information, such as state information, maintained across individual executions of a task. For example, when initially created, a VM 150 may initialize the OS 152, and each time the user code 156 is executed in the VM 150, a state of the VM 150 may change. State of a VM 150 may be maintained, for example, within registers of a virtual CPU of the VM 150, within RAM of the VM 150, within a virtual disk drive of the VM 150, or the like.

Thus, via operation of the on-demand code execution system 110, the data storage system 160 can facilitate rapid generation of computed data objects, in accordance with embodiments of the present disclosure.

The data storage system 160 and on-demand code execution system 110 are depicted in FIG. 1 as operating in a distributed computing environment including several computer systems that are interconnected using one or more computer networks (not shown in FIG. 1). The data storage system 160 and on-demand code execution system 110 could also operate within a computing environment having a fewer or greater number of devices than are illustrated in FIG. 1. Thus, the depiction of the data storage system 160 and on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein. In some instances, the data storage system 160 and on-demand code execution system 110 may be combined into a single service.

Further, the data storage system 160 and on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the data storage system 160 and on-demand code execution system 110 are illustrated as connected to the network 104. In some embodiments, any of the components within the data storage system 160 and on-demand code execution system 110 can communicate with other components of the on-demand code execution system 110 via the network 104. In other embodiments, not all components of the data storage system 160 and on-demand code execution system 110 are capable of communicating with other components of the virtual environment 100. In one example, only the frontends 120 and 162 (which may in some instances represent multiple frontends) may be connected to the network 104, and other components of the data storage system 160 and on-demand code execution system 110 may communicate with other components of the environment 100 via the respective frontends 120 and 164.

While some functionalities are generally described herein with reference to an individual component of the data storage system 160 and on-demand code execution system 110, other components or a combination of components may additionally or alternatively implement such functionalities. For example, while the data storage system 160 is depicted in FIG. 1 as including a data manager 168, such data manager may additionally or alternatively be implemented within the on-demand code execution system 110. Moreover, while the on-demand code execution system 110 is described as an example system to generate computed data objects, other compute systems may be used to generate computed data objects, which compute systems may include more, fewer or different components than depicted as part of the on-demand code execution system 110. In a simplified example, the data storage system 160 may include a physical computing device configured to compute data objects on demand, thus representing a compute system usable in accordance with embodiments of the present disclosure. Thus, the specific configuration of elements within FIG. 1 is intended to be illustrative.

Figure 2:
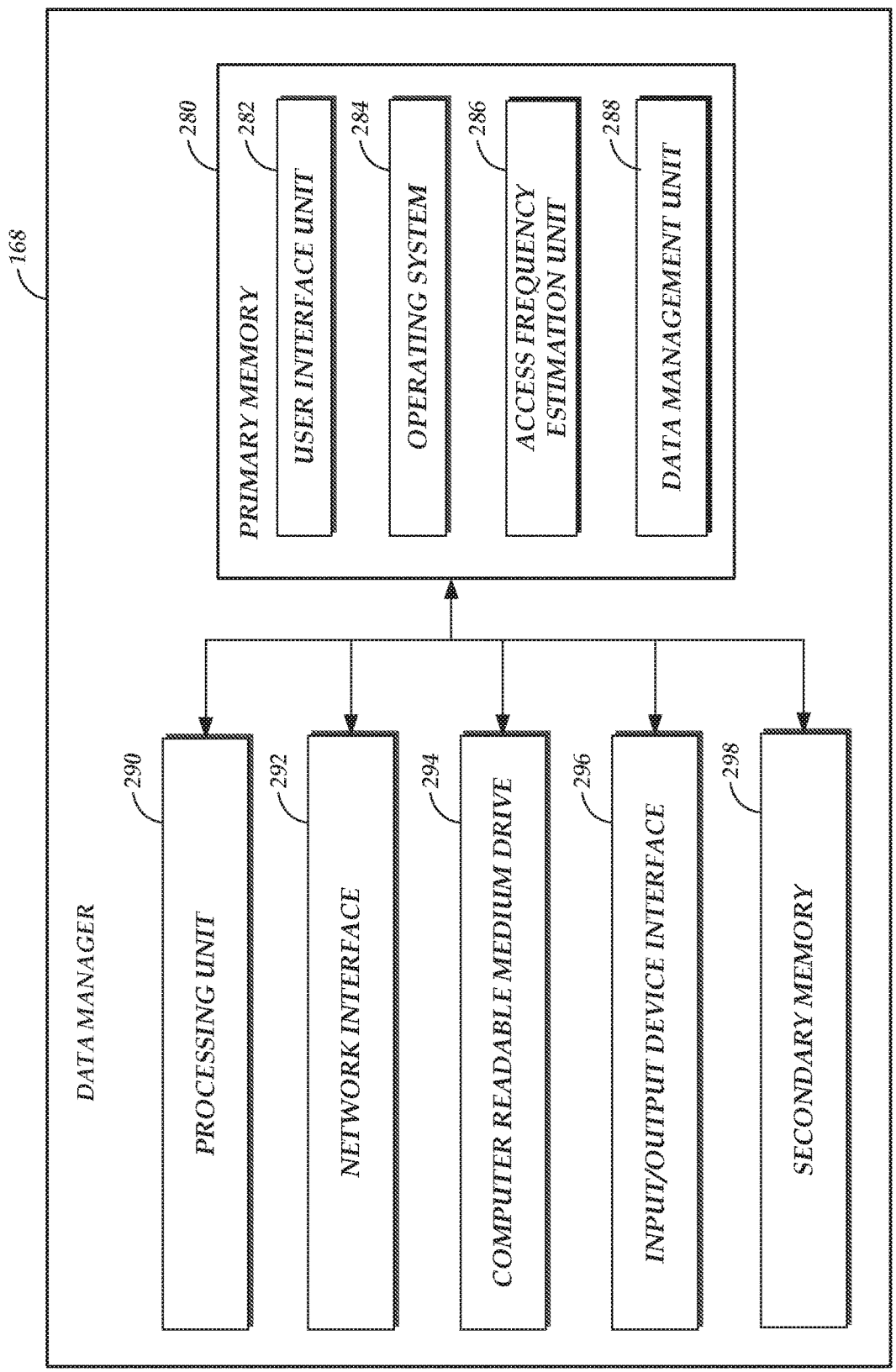
FIG. 2 depicts a general architecture of a computing device providing a data manager of the data storage system of FIG. 1, which may function to predict a timing of a next request for a computed data object, and to determine whether to store the data object on the data storage system based at least partly on such timing.

FIG. 2 depicts a general architecture of a computing system implementing a data manager 168 of FIG. 1. The general architecture of the data manager 168 depicted in FIG. 2 includes an arrangement of computer hardware and software that may be used to implement aspects of the present disclosure. The hardware may be implemented on physical electronic devices, as discussed in greater detail below. The data manager 168 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the data manager 168 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298.

The primary memory 280 may store an operating system 284 that provides computer program instructions for use by the processing unit 290 in the general administration and operation of the data manager 168. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device.

In addition to and/or in combination with the user interface unit 282, the memory 280 may include an access frequency estimation unit 286 executable to predict based on a history of access of data objects on the data storage system 160 a timing of a next request to access a given data object. The memory 280 may further include a data management unit 288 executable to determine, for a given data object and based on a timing of a next request to access the data object, whether to store the data object on the data storage system 160, or decline to store the data object in favor of recomputing the data object at a later time.

The data manager 168 of FIG. 2 is one illustrative configuration of such a device, of which others are possible. For example, while shown as a single device, a data manager 168 may in some embodiments be implemented as multiple physical host devices. Illustratively, a first device of such a data manager 168 may implement "control plane" functions, such as receiving requests to determine whether to store a computed data object and the like, while a second device may implement "data plane" operations, such as causing the data storage system 160 to store or decline to store a data object in response to instructions by the first device.

While described in FIG. 2 as a data manager, similar components may be utilized in some embodiments to implement other devices shown in the environment 100 of FIG. 1. For example, a similar device may implement a worker manager 140, as described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

Figure 3:
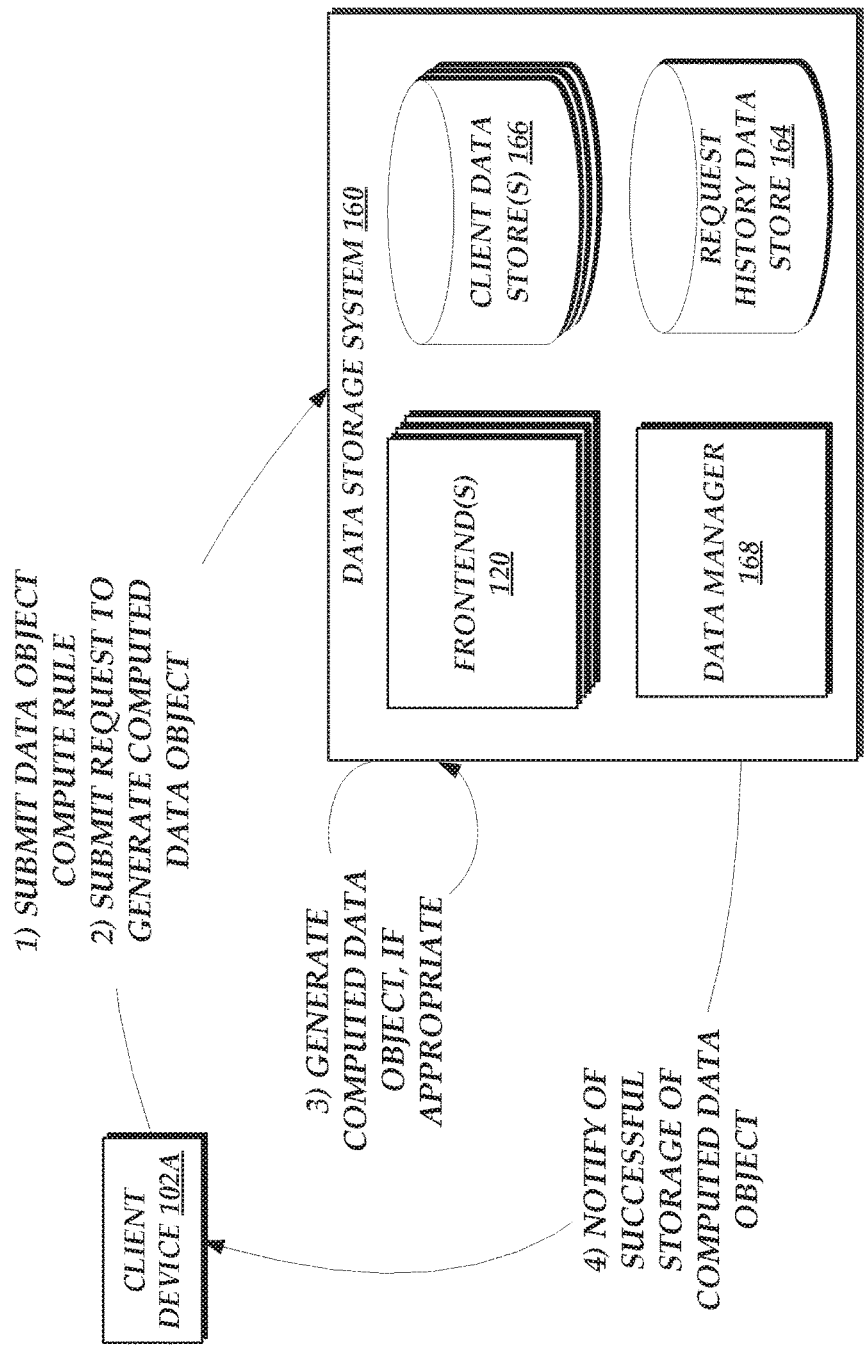
FIG. 3 is a flow diagram depicting illustrative interactions for handling a request from a user device to store a computed data object on the data storage system of FIG. 1, and for determining at the data storage system whether to compute and store the data object based at least partly on a predicted timing of a next request for a computed data object.

With reference to FIG. 3, illustrative interactions are depicted for handling a request to store a computed data object on the data storage system 160, potentially by use of simulated storage of the computed data object, where the data storage system 160 successfully processes the request without necessarily storing the computed data object. Specifically, at (1), a client device 102A submits to the data storage system 160 a data object compute rule, denoting how to generate a computed data object. In one embodiment, the compute rule is a task executable on the on-demand code execution system 110. Moreover, the compute rule may include criteria defining when to execute the task. For example, the compute rule may specify that the task should be executed each time a given type of data object is stored in the data storage system 160 (e.g., to transform the uploaded data object into a computed data object, such as a thumbnail of the uploaded data object). While the compute rule is depicted in FIG. 3 as being provided to the data storage system 160, the rule may additionally or alternatively be provided to the on-demand code execution environment 110, as the on-demand code execution environment 110 and the data storage system 160 may cooperate or be under control of a single entity to implement aspects of the present disclosure. Thus, in FIG. 3, interactions with the data storage system 160 should be understood to potentially encompass interactions with the on-demand code execution system 110.

At (2), the client device 102A submits to the data storage system 160 a request to generate a computed data object. In one embodiment, the request may correspond to a call to the task on the on-demand code execution environment 110 representing the data object compute rule. In another embodiment, the request may correspond to uploading of one data object on the data storage system 160 which triggers the data object compute rule, requesting generation of the computed data object from the uploaded data object. In either instance, the request generally specifies a desire for execution of a task on the on-demand code execution system 110 to generate a computed data object and to store such data object on the data storage system 160 for later access by a client device 102.

At (3), the data storage system 160 generates the computed data object, if appropriate. As noted above, the data storage system 160 can be generally configured to minimize resource consumption associated with storage of computed data objects, by delaying generation of computed data objects when the metrics of resource consumption for storage of the computed data object exceeds the metrics of resource consumption of generating the computed data object at or just prior to a next request to access the data object. In the example of FIG. 3, because the computed data object has not yet been generated, the data storage system 160 may compare a metric of resource consumption of generating the computed data object immediately and storing it until a next request to access the data object against a metric of resource consumption of generating the computed data object at or just prior to the next request. It might be assumed that under such conditions, the metric of resource consumption of generating the computed data object at or just prior to the next request would always be lower than the metric of resource consumption of generating the computed data object immediately and storing it until a next request to access the data object, since in either instance computational resources must be used to generate the data object. However, this assumption does not account for potential undesirability of delay in providing the computed data object, which may in some instances be increased when the data object is not stored at the data storage system 160 at the time of a request. For example, where computation of a data object is expected to takes period of time (e.g., 500 ms), while retrieval of a stored version of the data object is expected to take less time, the excess time required to compute the data object "on-demand" may be viewed negatively by a client device 102. The data storage system 160 may account for this delay by increasing a calculated metric for generating the data object at a later time. In one embodiment, a client device 102 may specify a weight to be associated with delays related to on-demand computation of data objects. An illustrative routine for calculation and comparison of metrics for generating and storing a computed data object against a metric related to computing a data object on demand is shown in FIG. 5. Based on comparing the metrics associated with computation and storage versus the metrics associated with on-demand computation of the data object, the data storage system 160 may generate the computed data object (if the metric of computation and storage does not exceed the metric of on-demand computation), or instead decline to generate the computed data object. Generation of a computed data object may include utilization of the on-demand code execution system 110 to generate the data object, as will be discussed in more detail with reference to FIG. 4.

In either instance, at (4), the data storage system 160 notifies the client device 102A of successful storage of the computed data object. Thus, from the point of view of the client device 102A, the computed data object has been stored at the data storage system 160, even when the data storage system 160 declined to store the computed data object.

Figure 4:
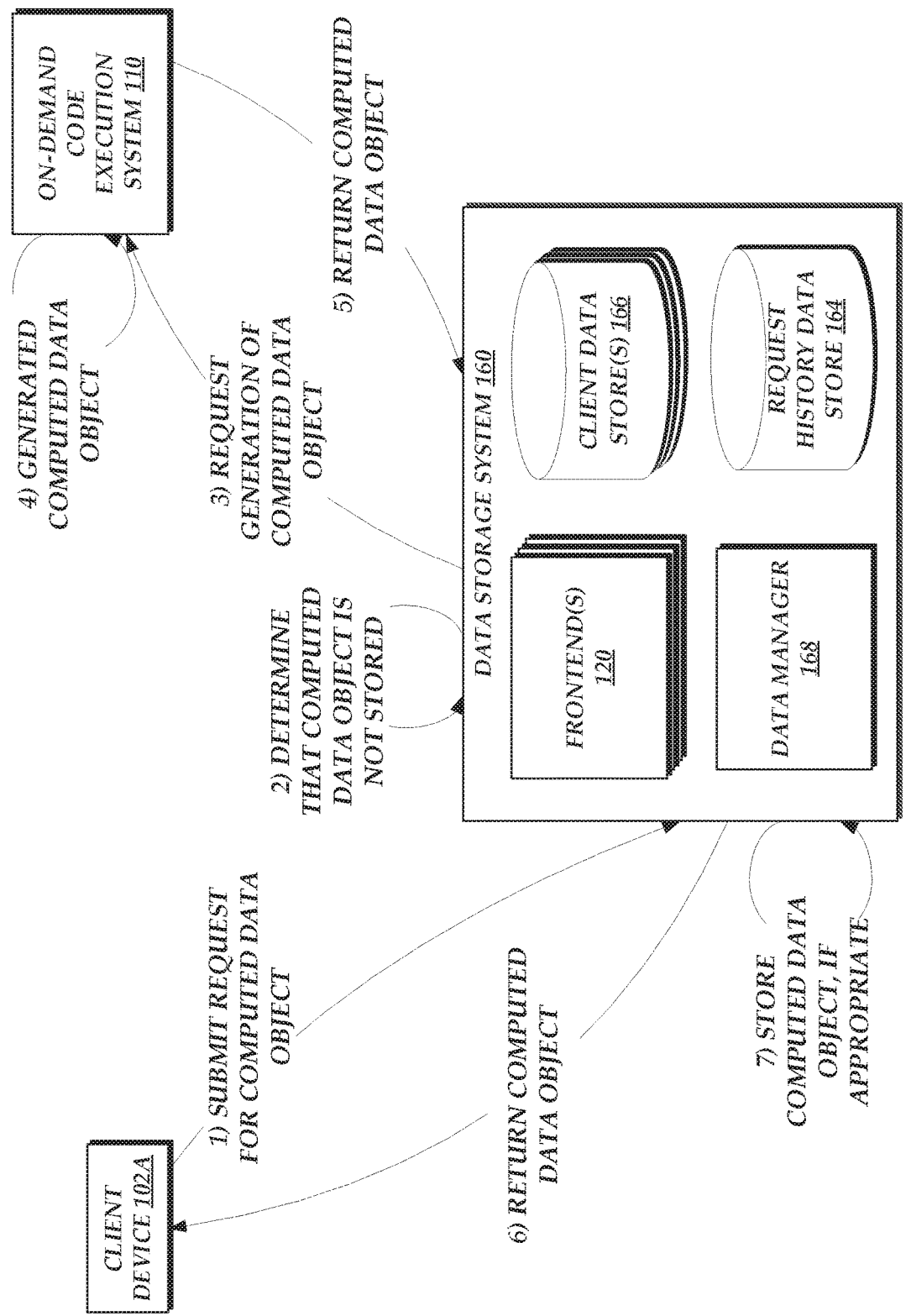
FIG. 4 is a flow diagram depicting illustrative interactions for handling a request for a computed data object for which the data storage system has simulated storage, and for determining at the data storage system whether to store the data object based at least partly on a predicted timing of a next request for a computed data object.
Figure 5:
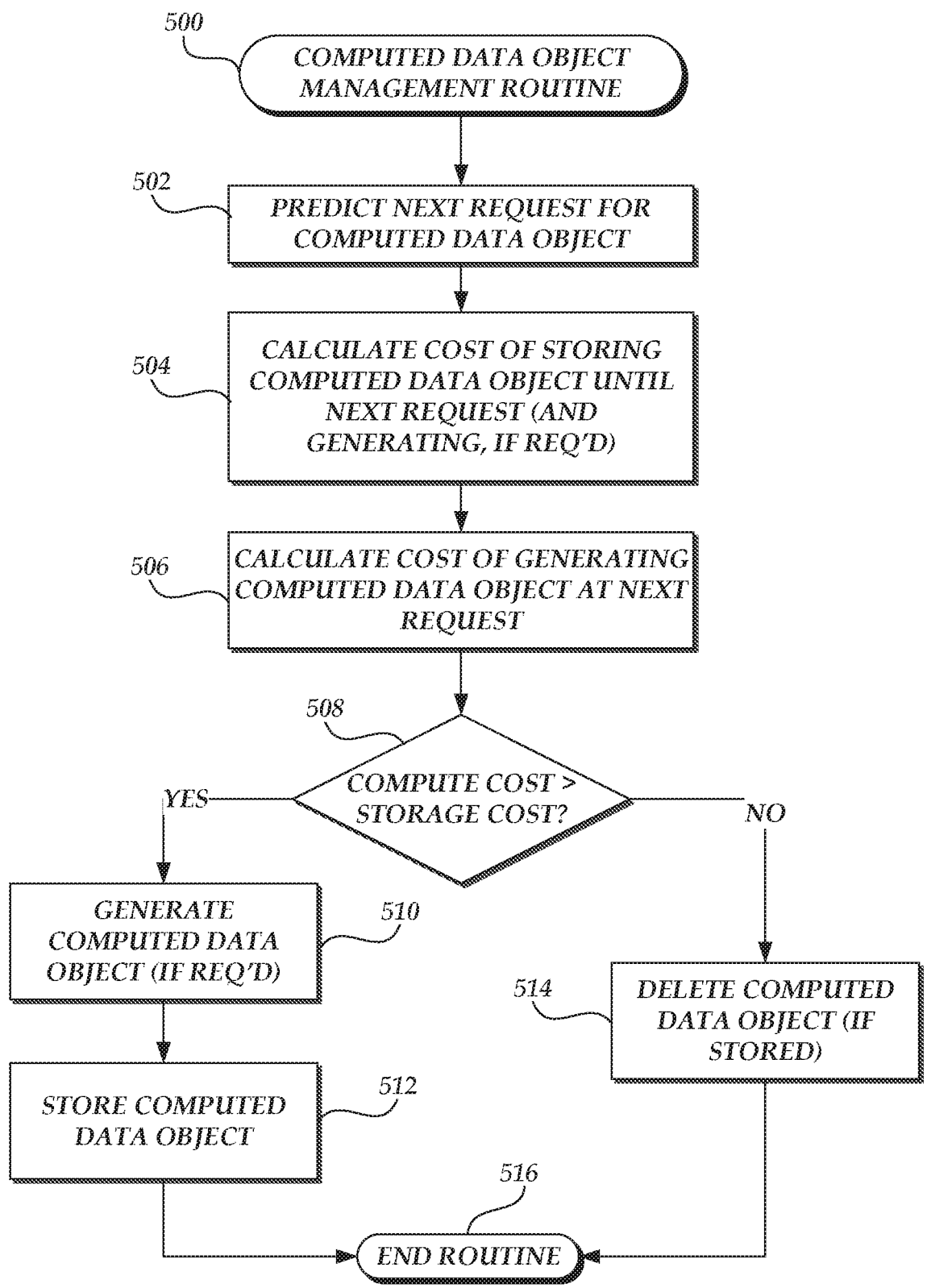
FIG. 5 is a flow chart depicting an illustrative routine for determining whether to store a computed data object at the data storage system of FIG. 1, or whether to simulate such storage, based at least partly on a predicted timing of a next request for a computed data object.

With reference to FIG. 4, illustrative interactions will be described for handling a request to access or retrieve a computed data object on the data storage system 160. The interactions begin at (1), where the client device 102A requests the computed data object from the data storage system 160. While the request is shown in FIG. 4 is stemming from the client device 102A, in some embodiments, other client devices 102 may additionally or alternatively request a data object. For example, a first client device 102A may utilize the data storage system 160 to store data associated with a web site or service (e.g., thumbnail images), and end users may interact with the service 160 to retrieve that data.

In the instance that the request data object has been stored at the data storage system 160, the data storage system 160 may simply return the data object to the client device 102, in accordance with known operation of network-based storage services. However, for the purposes of illustration, it is assumed that the data storage system 160 has not stored the computed data object, but instead elected to delay generation of the computed data object until a request for that object is retrieved. Thus, at (2), the data storage system 160 determines that the computed data object identified in the request is not stored at the data storage system 160.

Accordingly, at (3), the data storage system 160 submits a request to the on-demand code execution system 110 to generate the data object. The request may correspond, for example, to invocation of a task represented by the data object compute rule submitted to the data storage system 160. The request may further include a source data object, from which the computed data object is to be computed. Illustratively, where the computed data object is a thumbnail image, the request may specify a full resolution image used to generate the thumbnail image.

At (4), the on-demand code execution system 110 generates the computed data object, such as by execution of a task to process a source data object to result in the computed data object. Operation of the on-demand code execution system 110 to execute tasks is discussed in more detail in the '556 Patent, incorporated by reference above.

At (5), the on-demand code execution system 110 returns the computed data object to the data storage system 160. The data storage system 160, in turn, returns the computed data object to the client device 102A, satisfying the initial request. Because the on-demand code execution system 110 can be configured to satisfy requests for generation of computed data objects quickly (e.g., on the order of tens or hundreds of milliseconds), it is expected that relatively little or no delay would be incurred to undertake the interactions of FIG. 4, as opposed to interactions to return a data object actually stored at the data storage system 160 at the time of a request. Thus, the interactions of FIG. 4 can be utilized to simulate storage of computed data objects, without requiring that the data storage system 160 actually store the computed data object.

In addition, at (7), the data storage system 160 determines whether to store the computed data object, or to discard the data object in favor of recomputing the data object at or just prior to a next request for the data object. This determination is similar to as discussed above, and can include weighing a metric of storing the computed data object at the data storage system 160 against a metric of recomputing the computed data object at or just prior to the next request.

With reference to FIG. 5, an illustrative routine 500 is depicted enabling the data storage system 160 to make the determinations discussed above with reference to interaction (7) of FIG. 4 as well as interaction (3) of FIG. 3. The routine 500 may additionally or alternatively be carried out at other times. For example, the routine 500 may be carried out periodically on the data storage system 160 for each computed data object stored (and/or simulated as being stored), to determine whether storage of the computed data object is appropriate going forward. The routine 500 is illustratively implemented by the data manager 168.

The routine 500 begins at block 502, where the data manager 168 predicts a next request for a computed data object (e.g., as a period of time until the next request). In one embodiment, the data manager 168 may predict a next request based on a history of requests for the data object, such as by calculating a frequency of historical requests for the data object, and extrapolating from the frequency and a last request a predicted time of a next request. In some embodiments, the data manager 168 may utilize additional or alternative techniques, such as linear regression analysis or other statistical measures, to predict a timing of a next (or other future) requests based on a history of requests. Still further, in some embodiments the data manager 168 may utilize machine learning techniques (e.g., neural networks) to predict a timing of a next request to access a data object. A variety of techniques utilizing statistical models or machine learning to predict a next event in a sequence of events are known in the art, any of which may be applied in accordance with embodiments of the present disclosure to predict a timing of a next request for a data object. In some instances, such as where history of requests to access a data object are limited, the data manager 168 may additionally or alternatively utilize a history of requests to access other data objects on the data storage system to predict a timing of a next request to access a computed data object. Other data objects may include, for example, other data objects designated for storage within a common storage location (e.g., the same folder, group, or bucket), other data objects sharing common formats, other data objects of the user, other data objects computed based on execution of the same task, etc.

At block 504, the data manager 168 calculates a metric of resource consumption for storing the computed data object until the predicted next request. Illustratively, the metric of resource consumption for storing the computed data object may be based on an availability of memory required to store the data object over the period of time until the predicted next request. The memory required to store the data object may be determined based, for example, on a prior generation of the computed data object, or on similar computed data object that have previously been generated. Thus, the metric for storing the computed data object until the predicted next request may be computed by multiplying together the memory required to store the data object and an availability metric of such memory over the period of time until the next predicted request. In one embodiment, the availability metric of memory is set based on a current availability of memory to store the data object (e.g., such that lower availability results in a higher metric). In another embodiment, the availability metric of memory may vary over time, such as based on a forecasted availability. The availability metric may illustratively be represented as a dimensionless quantity, or in a dimension disassociated with memory as a computing resource, in able to allow for comparison of the metric to other potential metrics.

In some instances, at block 504, the data manager 168 may additionally calculate a resource metric for generating the computed data object. Generally, such a resource metric for may be calculated at block 504 only when computational resources are not already "sunk"—that is, when the computed data object has not already been generated. For example, block 504 may include calculating a resource metric for generating a data object when the routine 500 is implemented at interaction (3) of FIG. 3. Block 504 may exclude calculating a resource metric for generating a data object when the routine 500 is implemented at interaction (7) of FIG. 4, since the computed data object is already available at the service 160 and need not be recomputed.

The metric for generating the computed data object may be based, for example, on processing power, processing time, and memory of the on-demand code execution system 110 to compute the data object. The metric may additionally or alternatively be based on network bandwidth used to compute the data object (e.g., in transferring a source data object to the system 110 and transferring the computed data object from the system 110 to the data storage system 160). In one embodiment, the calculated metric may be based on historical computing resources used to generate the computed data object, which may be expected to remain stable over time, multiplied by current availability metrics associated with such resources. In another embodiment, the calculated metric may be based on historical computing resources used to generate similar data objects, as multiplied by current availability metrics associated with such resources. As with metrics for storing the data object, the metric for generating the data object may be expressed as a dimensionless quantity, or in a dimension disassociated with the specific computing resources used to compute the data object.

At block 506, the data manager 168 additionally computes an expected metric for computing the child data object at the time of the predicted next request for the data object. Generally, this expected metric may be calculated similarly to the present metric of generating the computed data object, as described above (e.g., based on the expected computing resources of the on-demand code execution system 110 to generate the computed data object). However, in one embodiment, the expected metric of generating the computed data object at the time of the predicted next request for the data object is based on forecasted computing resource availability metrics at the time of the next predicted request. Illustratively, if the next request is predicted to occur during a time of high computing resource availability, the expected metric for generating the computed data object at the time of the predicted next request for the data object may be lower than a present metric for generating the computed data object. If the next request is predicted to occur at a time of low computing resource availability, the expected metric for generating the computed data object at the time of the predicted next request for the data object may be higher than a present metric for generating the computed data object.

Moreover, in some instances, the expected metric for of generating the computed data object at the time of the predicted next request for the data object may include a predicted delay in satisfying a request for the data object using on-the-fly computation, as opposed to storing the computed data object prior to such a request. For example, a client device 102 instructing the service 160 to store the computed data object (or simulate such storage) may assign a metric for a delay in providing the data object in response to a request. The data manager 168 may therefore predict such a delay (e.g., as the excess time required to generated the computed data object versus retrieving the data object from storage), based for example on historical data regarding time required to generate or retrieve the computed data object or similar data objects. The data manager 168 may then increase expected metric for computing the child data object at the time of the predicted next request for the data object based on the predicted delay, weighted according to the assigned weighting for the delay. Thus, the expected metric for computing the child data object at the time of the predicted next request for the data object can be modified to account for potential delays associated with simulated storage.

At block 508, the data manager 168 compares the expected metric calculated at block 504 with the expected metric calculated at block 506. If the expected metric for computing the child data object at the time of the predicted next request for the data object is less than the expected metric for storing the data object (and generating the data object at a present time, if necessary), the routine 500 proceeds to block 514. At block 514, any presently maintained representation of the computed data object is deleted, as the data manger 168 has elected to simulate storage of the computed data object, rather than incur the resource usage to store that representation. The routine 500 may then end at block 516.

Alternatively, if the expected metric for computing the child data object at the time of the predicted next request for the data object is greater than the expected metric for storing the data object (and generating the data object at a present time, if necessary), the routine 500 proceeds to block 510, where the computed data object is generated (if not already stored at the data storage system 160). Illustratively, the computed data object may be generated based on interaction with an on-demand code execution system 110, as described above. Further, at block 512, the computed data object is stored at the data storage system 160, in accordance with typical operation of a network-based data storage system. The data storage system 160 thus incurs the resource usage to store the computed data object, as opposed to incurring the delays or resource usage to generate the computed data object at a later time (e.g., in response to a request for the computed data object). The routine 500 may then end at block 516.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to imitate storage of a data object and avoid compute resource consumption associated with storage of the data object, the system comprising:
   a compute system comprising at least one processor configured with instructions that, when executed, cause the compute system to generate a computed data object from a source data object according to a user-defined transformation; and
   a data storage system storing the source data object and configured with computer-executable instructions to:
      receive a request to store the computed data object in the data storage system;
      utilize historical data regarding requests for the computed data object on the data storage system to estimate a time of a next request for the computed data object;
      determine that an estimated resource consumption to generate the computed data object at the compute system in response to the next request is less than an estimated resource consumption to store the computed data object in the data storage system until the next request;
      without causing the computed data object to be stored in the data storage system, return an indication that the request has been successfully processed;
      receiving the next request from a client device; and
      in response to the next request:
         utilize the compute system to generate the computed data object from the source data object; and
         return the computed data object to the client device.

2. The system of claim 1, wherein the receiving request to store the computed data object at the data storage system comprises receiving an instruction to store the computed data object at the data storage system when the source data object is provided, and receiving the source data object.

3. The system of claim 1, wherein the compute system is an on-demand code execution system.

4. The system of claim 3, wherein the user-defined transformation is defined within code executable on the on-demand code execution system.

5. The system of claim 1, wherein returning the indication without causing the computed data object to be stored at the data storage system comprises deleting a copy of the compute data object stored at the data storage system.

6. A method implemented by a data storage system storing a source data object, comprising:
   receiving a request to store a computed data object, the computed data object generated from the source data object according to a user-defined transformation;
   utilizing historical data regarding requests for the computed data object at the data storage system to estimate a time of a next request for the computed data object;
   determining that an estimated resource consumption to generate the computed data object at a compute system in response to the next request is less than an estimated resource consumption to store the computed data object at the data storage system until the next request;
   delaying storage of the computed data object until the next request;
   receiving the next request from a client device; and
   in response to the next request:
      generating the computed data object from the source data object; and
      returning the computed data object to the client device.

7. The method of claim 6, wherein the estimated resource consumption of storing the computed data object at the data storage system until the next request includes an estimated resource consumption of generating the computed data object at a present time.

8. The method of claim 6, wherein the estimated resource consumption of generating the computed data object at a compute system in response to the next request is weighted according to a delay associated with request-driven generation of the computed data object.

9. The method of claim 8, wherein the delay associated with request-driven generation of the computed data object corresponds to additional time estimated as required to generate the computed data object at a compute system in response to the next request beyond the estimated time to retrieve a stored copy of the computed data object.

10. The method of claim 6, wherein the estimated resource consumption of generating the computed data object at the compute system is based at least partly on one or more of an estimated usage of processing power of the compute system to generate the computed data object, an estimated availability of the processing power, an estimated usage of memory of the compute system to generate the computed data object, an estimated availability of the memory, an estimated usage of network bandwidth of the compute system, or an estimated availability of the network bandwidth.

11. The method of claim 10, wherein at least one of the estimated availability of the processing power, the estimated availability of the memory, or the estimated availability of network bandwidth are a future forecasted availability of the respective compute resource.

12. The method of claim 6, wherein the estimated resource consumption of storing the computed data object at the data storage system until the next request is based at least in part on an amount of storage space required to store the computed data object.

13. The method of claim 6 further comprising:
  utilizing historical data regarding requests for data objects at the data storage system to estimate a time of a subsequent request for the computed data object;
  determining that an estimated resource consumption of generating the computed data object at the compute system in response to the subsequent request is less than an estimated resource consumption of storing the computed data object at the data storage system until the subsequent request; and
  deleting the computed data object.

14. Non-transitory computer-readable media comprising computer-executable instructions that, when executed by a data storage system, cause the data storage system to:
  receive instructions to store a computed data object, the computed data object generated from a source data object accessible to the data storage system;
  utilize historical data regarding requests for data objects at the data storage system to estimate a time of a next request for the computed data object;
  determine that an estimated resource consumption to generate the computed data object at the data storage system in response to the next request is less than an estimated resource consumption to store the computed data object at the data storage system until the next request;
  decline to store the computed data object responsive to the instructions;
  receive the next request from a client device; and
  in response to the next request:
    generate the computed data object from the source data object; and
    return the computed data object to the client device.

15. The non-transitory computer-readable media of claim 14, wherein the computer-executable instructions further cause the system to:
  utilize historical data regarding requests for data objects at the data storage system to estimate a time of a subsequent request for the computed data object;
  determine that an estimated resource consumption of generating the computed data object at the data storage system in response to the subsequent request is less than an estimated resource consumption of storing the computed data object at the data storage system until the subsequent request; and
  delete the computed data object.

16. The non-transitory computer-readable media of claim 14, wherein the computer-executable instructions further cause the system to update the historical data based at least in part on the next request.

17. The non-transitory computer-readable media of claim 14, wherein the computer-executable instructions further cause the system to:
  utilize historical data regarding requests for data objects at the data storage system to estimate a time of a subsequent request for the computed data object;
  determine that an estimated resource consumption of generating the computed data object at the data storage system in response to the subsequent request is greater than an estimated resource consumption of storing the computed data object at the data storage system until the subsequent request; and
  store the computed data object at the data storage system.

18. The non-transitory computer-readable media of claim 14, wherein the historical data regarding requests for data objects at the data storage system comprises at least one of historical data regarding requests for the computed data object or historical data regarding requests for other data objects computed from the source data object.

19. The non-transitory computer-readable media of claim 14, wherein the computed data object is generated from the source data object based at least in part on execution of user-defined executable code, and wherein the historical data regarding requests for the computed data object comprises historical data regarding request for other data objects generated based at least in part on execution of user-defined executable code.

20. The non-transitory computer-readable media of claim 14, wherein the source data object is passed as a parameter within the instructions to store a computed data object.

* * * * *